United States Patent
Kopp et al.

(10) Patent No.: US 10,203,713 B2
(45) Date of Patent: Feb. 12, 2019

(54) METHOD AND SYSTEM FOR RECOMMENDING POTENTIAL CHANGES IN ENERGY CONSUMPTION IN A BUILT ENVIRONMENT

(71) Applicant: Conectric, LLC, Lewes, DE (US)

(72) Inventors: Phillip Kopp, San Diego, CA (US); Wolfgang Lukaschek, Mattersburg (AT)

(73) Assignee: CONECTRIC, LLC, Lewes, DE (US)

( * ) Notice: Subject to any disclaimer, the term of this patent is extended or adjusted under 35 U.S.C. 154(b) by 335 days.

(21) Appl. No.: 15/184,915

(22) Filed: Jun. 16, 2016

(65) Prior Publication Data
US 2016/0371289 A1    Dec. 22, 2016

Related U.S. Application Data

(60) Provisional application No. 62/181,351, filed on Jun. 18, 2015.

(51) Int. Cl.
| | |
|---|---|
| *G06F 17/00* | (2006.01) |
| *G05F 1/66* | (2006.01) |
| *G06N 7/00* | (2006.01) |
| *G06F 17/30* | (2006.01) |

(52) U.S. Cl.
CPC ............ *G05F 1/66* (2013.01); *G06F 17/3097* (2013.01); *G06N 7/005* (2013.01); *G05B 2219/42001* (2013.01)

(58) Field of Classification Search
CPC ........ G06F 9/542; G06F 9/4843; G06F 19/00; G06F 8/65; G06F 17/18; G06F 2209/482; G06F 17/00
See application file for complete search history.

(56) References Cited

U.S. PATENT DOCUMENTS

2008/0082183 A1* 4/2008 Judge .................... G05B 15/02
700/33

* cited by examiner

*Primary Examiner* — Truong V Vo
(74) *Attorney, Agent, or Firm* — Procopio, Cory, Hargreaves & Savitch LLP (57) ABSTRACT

The present disclosure provides a system and method for recommending one or more potential changes in operating parameters of a built environment. The one or more potential changes are associated with a plurality of energy load sources. The method includes a step of fetching a first set of statistical data associated with each of a plurality of energy consuming devices. The method includes another step of collecting a third set of statistical data associated with one or more ambient parameters of the built environment. The method includes yet another step of analyzing the first set of statistical data, the second set of statistical data and the third set of statistical data. In addition, the method includes yet another step of recommending the one or more potential changes for the energy consumption of each of the plurality of energy consuming devices.

20 Claims, 5 Drawing Sheets

FIG. 5 ial Patent Application Ser. No. 62/181,351,
METHOD AND SYSTEM FOR RECOMMENDING POTENTIAL CHANGES IN ENERGY CONSUMPTION IN A BUILT ENVIRONMENT

CROSS-REFERENCE TO RELATED APPLICATIONS

This application claims priority under 35 U.S.C. 119(e) to U.S. Provisentitled "SYSTEM AND METHOD FOR A DISTRIBUTED APPROACH TO DATA COLLECTION AND DISPLAY TO DEVELOP A PERSISTENT ENERGY MODEL WHICH INCLUDES MOVABLE AND FIXED ENERGY CONSUMING LOAD SOURCES AND ESTABLISHES A REFERENCE OF DIS-AGGREGATED ENERGY AND WATER CONSUMPTION OF SPECIFIC APPLIANCES AND LOADS IN A BUILT ENVIRONMENT," filed Jun. 18, 2015. The entirety of the disclosure of the above-identified application is incorporated herein by reference as if set forth in full.

TECHNICAL FIELD

The present disclosure relates to a field of energy management system. More specifically, the present disclosure relates to an optimized recommendation system for improving energy consumption of the built environment.

BACKGROUND

With the advent in technological advancements over the past few decades, there has been an exponential rise in the number of large facilities. These facilities are big residential complexes, commercial offices, shopping centers and the like. The energy consumption of these facilities is usually very high. These large facilities include many electrical and mechanical devices which require huge amount of electrical power. A slight increase or decrease increase in the energy consumption of these facilities makes a huge impact commercially.

In general, a consistent check on the energy consumption pattern or energy audit in these large facilities is maintained. The owner/administrator of the large facility usually hires a consultancy firm/a third party service provider/an in-house team to assess the energy consumption, future energy consumption, probable saving in the future energy consumption, profit and expenses that would be incurred to save the future probable energy consumption, and so on. Presently, the energy auditing techniques employed by these third party service providers provide a set of periodic recommendations for improving the energy consumption. The third party service providers perform audit by collecting, analyzing, recognizing and recommending a number of changes in the energy consumption which can bring down the overall energy consumption rate.

These recommendations are highly inaccurate and do not bring about a substantial effect to the overall energy consumption. The existing systems do not take into account an occupancy behavior and energy consumption pattern for users inside the facilities. Further, these existing systems are unable to capture energy consumption data associated with each and every energy consuming device present inside the facilities. The current data collections methods are archaic and there is a consistent need to develop better data collection methods which can collect data from each and every device in real time.

In addition, a proper communication and feedback control system is either limited or absent in these systems. This leads to cost escalation and frequent manual maintenance of electrical and mechanical systems, thus employing bulk of users. Moreover, the existing systems do not take into account present weather conditions and seasonal energy consumption while recommending one or more changes in energy consumption inside the large facilities. The administrators have no idea about which energy consuming devices consume most of the energy which does not provision the users to effectively reduce the energy costs. Further, the administrators have no idea how to maintain a balance between the energy consumption of various devices in different seasons.

In light of the above stated discussion, there is a need for a method and system that overcomes the above stated disadvantages.

SUMMARY

In one aspect, the present disclosure provides a method for recommending one or more potential changes in operating parameters of a built environment. The one or more potential changes are associated with a plurality of energy load sources. The method includes a step of fetching a first set of statistical data associated with each of a plurality of energy consuming devices. In addition, the first set of statistical data and a second set of statistical data are associated with each of a plurality of users present inside the built environment. The method includes another step of collecting a third set of statistical data associated with one or more ambient parameters of the built environment. The method includes yet another step of analyzing the first set of statistical data, the second set of statistical data and the third set of statistical data. The analysis is performed to obtain an energy consumption pattern of each of the plurality of energy consuming devices present inside the built environment. In addition, the method includes yet another step of recommending the one or more potential changes for the energy consumption of each of the plurality of energy consuming devices. The first set of statistical data is fetched based on a first plurality of parameters and the second set of statistical data is fetched based on a second plurality of parameters. The third set of statistical data includes a past energy consumption data and one or more environmental conditions. The past energy consumption data and the one or more environmental conditions are obtained from one or more sources. The analysis of the first set of statistical data, the second set of statistical data and the third set of statistical data is done by recognizing one or more data points. The one or more data points of the first set of statistical data, the second set of statistical data and the third set of statistical data are recognized against a plurality of factors. The one or more potential changes are recommended to improve the energy consumption behavior of each of the plurality of energy consuming devices. The one or more potential changes are recommended based on the analysis of the one or more data points.

In an embodiment of the present disclosure, the method includes yet another step of updating the first set of statistical data, the second set of statistical data, the third set of statistical data and the one or more potential changes.

In an embodiment of the present disclosure, the one or more potential changes are recommended for prompting each of a plurality of users to apply the one or more potential changes. The application of the one or more potential changes enables reduction of the energy consumption of the built environment.

In an embodiment of the present disclosure, the method includes yet another step of storing the first set of statistical data, the second set of statistical data, the third set of statistical data and the one or more potential changes.

In an embodiment of the present disclosure, the method includes yet another step of displaying the first set of statistical data, the second set of statistical data and the third set of statistical data on one or more monitoring devices. In addition, the one or more potential changes are displayed on the one or more monitoring devices.

In an embodiment of the present disclosure, the first set of statistical data, the second set of statistical data and the third set of statistical data are analyzed. The analysis is performed by application of a statistical regression and extrapolation to the energy consumption behavior of each of the plurality of energy consuming devices. The first set of statistical data, the second set of statistical data and the third set of statistical data are analyzed by segregating classes into energy efficient devices and energy inefficient devices.

In an embodiment of the present disclosure, the one or more potential changes are improved by utilizing a learning algorithm. The learning algorithm enables acceleration of assessment and analysis of the one or more data points associated with the energy consumption of each of the plurality of energy consuming devices.

In an embodiment of the present disclosure, the first plurality of parameters includes one or more physical characteristics and one or more operational characteristics. The one or more operational characteristics include a power rating, current usage based on load, voltage, frequency, phase, energy efficiency, thermal efficiency and cost of operations. In addition, the one or more operational characteristics includes a duration of the energy usage for each of the plurality of energy consuming devices, a seasonal variation and an off-seasonal variation in the energy consumption. The one or more physical characteristics include size, physical location, temperature, weight and portability of mechanical and electrical device.

In an embodiment of the present disclosure, the second plurality of parameters include an occupancy behavior of the plurality of users, an energy consuming pattern associated and a physical location of each of the plurality of users. In addition, the second plurality of parameters includes duration of energy usage and seasonal variation and off-seasonal variation in the real time occupancy pattern of the plurality of users.

In an embodiment of the present disclosure, the plurality of factors include base load, variable load, cost of the operations, power consumption, a duration of the energy usage, peak energy demand and average consumption of energy during a specific period. In addition, the plurality of factors include a real time occupancy pattern of each of the plurality of users, the energy demand based on a seasonal variation and an off-seasonal variation and an energy usage based on weather conditions. The one or more sources of the third set of statistical data are a plurality of external application program interfaces and one or more third party databases.

In an embodiment of the present disclosure, the one or more potential changes include replacement of the energy consuming device with a known energy consuming device. The known energy consuming device has a higher percentage of energy efficiency. The one or more potential changes include regulation of duration of energy usage and a power supply to each of the plurality of energy consuming devices based on an occupancy pattern. In addition, the one or more potential changes include utilizing a control system with feedback to control operations, a cost effective device upgrade and displaying a list of malfunctioning devices.

In another aspect, the present disclosure provides a computer system. The computer system includes one or more processors and a memory. The memory is coupled to the one or more processors. The memory is used to store instructions. The instructions in the memory when executed by the one or more processors cause the one or more processors to perform a method. The one or more processors perform the method for recommending one or more potential changes in operating parameters of a built environment. The one or more potential changes are associated with a plurality of energy load sources. The method includes a step of fetching a first set of statistical data associated with each of a plurality of energy consuming devices. In addition, the first set of statistical data and a second set of statistical data are associated with each of a plurality of users present inside the built environment. The method includes another step of collecting a third set of statistical data associated with one or more ambient parameters of the built environment. The method includes yet another step of analyzing the first set of statistical data, the second set of statistical data and the third set of statistical data. The analysis is performed to obtain an energy consumption pattern of each of the plurality of energy consuming devices present inside the built environment. In addition, the method includes yet another step of recommending the one or more potential changes for the energy consumption of each of the plurality of energy consuming devices. The first set of statistical data is fetched based on a first plurality of parameters and the second set of statistical data is fetched based on a second plurality of parameters. The third set of statistical data includes a past energy consumption data and one or more environmental conditions. The past energy consumption data and the one or more environmental conditions are obtained from one or more sources. The analysis of the first set of statistical data, the second set of statistical data and the third set of statistical data is done by recognizing one or more data points. The one or more data points of the first set of statistical data, the second set of statistical data and the third set of statistical data are recognized against a plurality of factors. The one or more potential changes are recommended to improve the energy consumption behavior of each of the plurality of energy consuming devices. The one or more potential changes are recommended based on the analysis of the one or more data points.

In yet another aspect, the present disclosure provides a computer-readable storage medium. The computer readable storage medium enables encoding of computer executable instructions. The computer executable instructions when executed by at least one processor perform a method. The at least one processor performs the method for recommending one or more potential changes in operating parameters of a built environment. The one or more potential changes are associated with a plurality of energy load sources. The method includes a step of fetching a first set of statistical data associated with each of a plurality of energy consuming devices. In addition, the first set of statistical data and a second set of statistical data are associated with each of a plurality of users present inside the built environment. The method includes another step of collecting a third set of statistical data associated with one or more ambient parameters of the built environment. The method includes yet another step of analyzing the first set of statistical data, the second set of statistical data and the third set of statistical data. The analysis is performed to obtain an energy consumption pattern of each of the plurality of energy consuming devices present inside the built environment. In addition, the method includes yet another step of recommending the one or more potential changes for the energy consumption of each of the plurality of energy consuming devices. The first set of statistical data is fetched based on a first plurality of parameters and the second set of statistical data is fetched based on a second plurality of parameters. The third set of statistical data includes a past energy consumption data and one or more environmental conditions. The past energy consumption data and the one or more environmental conditions are obtained from one or more sources. The analysis of the first set of statistical data, the second set of statistical data and the third set of statistical data is done by recognizing one or more data points. The one or more data points of the first set of statistical data, the second set of statistical data and the third set of statistical data are recognized against a plurality of factors. The one or more potential changes are recommended to improve the energy consumption behavior of each of the plurality of energy consuming devices. The one or more potential changes are recommended based on the analysis of the one or more data points.

BRIEF DESCRIPTION OF THE FIGURES

Having thus described the invention in general terms, reference will now be made to the accompanying drawings, which are not necessarily drawn to scale, and wherein:

DETAILED DESCRIPTION

In the following description, for purposes of explanation, numerous specific details are set forth in order to provide a thorough understanding of the present technology. It will be apparent, however, to one skilled in the art that the present technology can be practiced without these specific details. In other instances, structures and devices are shown in block diagram form only in order to avoid obscuring the present technology.

Reference in this specification to "one embodiment" or "an embodiment" means that a particular feature, structure, or characteristic described in connection with the embodiment is included in at least one embodiment of the present technology. The appearance of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but no other embodiments.

Moreover, although the following description contains many specifics for the purposes of illustration, anyone skilled in the art will appreciate that many variations and/or alterations to said details are within the scope of the present technology. Similarly, although many of the features of the present technology are described in terms of each other, or in conjunction with each other, one skilled in the art will appreciate that many of these features can be provided independently of other features. Accordingly, this description of the present technology is set forth without any loss of generality to, and without imposing limitations upon, the present technology.

Figure 1:
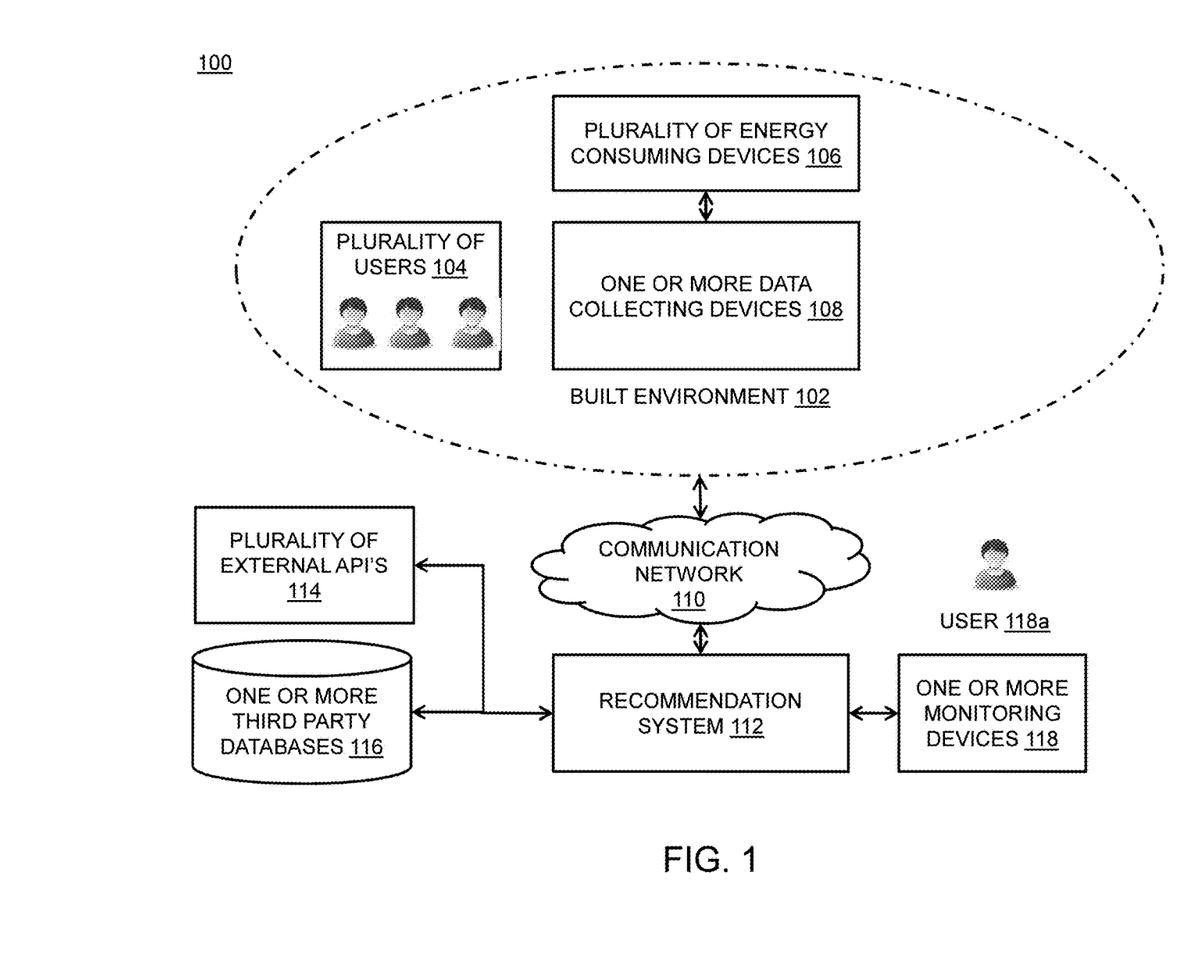
FIG. 1 illustrates a system to recommend one or more potential changes in operating parameters of a plurality of energy loads inside a built environment, in accordance with various embodiments of the present disclosure.

FIG. 1 illustrates a system 100 to recommend one or more potential changes in operating parameters of a plurality of energy loads, in accordance with various embodiments of the present disclosure. The plurality of energy loads is present inside a built environment. In addition, the one or more potential changes in the operating parameters pertain to each of a plurality of energy consuming devices present inside a built environment. The one or more potential changes in the operating parameters is based on analysis of one or more data points obtained from a first set of statistical data, a second set of statistical data and a third set of statistical data (as described below in the patent application). The one or more potential changes are recommended to improve an energy efficiency of the built environment.

Further, the system 100 includes a built environment 102, a plurality of energy consuming devices 106, one or more data collecting devices 108, a communication network 110, a recommendation system 112, a plurality of external application program interfaces 114 (hereafter "API"), one or more third party databases 116 and one or more monitoring devices 118. The above arrangement of the system elements provide recommendations based on the energy consumption inside the built environment 102.

Furthermore, the built environment 102 is a closed or semi-closed structure with one or more number of floors installed with a plurality of the energy consuming devices. Examples of the built environment 102 include but may not be limited to an office, a mall, an airport, a stadium, a hotel and a manufacturing plant. In addition, the built environment 102 is equipped with a supply system that supplies energy obtained from a plurality of resources for a plurality of operations. Moreover, the plurality of operations associated with the energy consumption inside the built environment 102 includes air conditioning, lightings, lifting, charging, driving motors, and the like. In addition, the plurality of resources of the energy includes solar powered energy, energy from local supply grid, thermal energy plants, hydel energy and the like. The energy consumption is based on an energy balance between demand and the supply of the energy.

In addition, the built environment 102 is associated with a plurality of users 104 present inside the built environment 102. The plurality of users 104 may be associated with the built environment 102 for any purpose. The plurality of users 106 includes one or more human operators, one or more human workers, one or more occupants, visitors and the like. In an example, the one or more human operators monitor and regulate operations of one or more devices of the plurality of energy consuming devices. In another example, the one or more human workers clean, sweep and repair the built environment 102. In yet another example, the one or more occupants are employees. The employees include managers, attendants, assistants, clerk, security staff and the like. In yet another example, the visitors are civilians present for a specific period of time.

Moreover, the built environment 102 is equipped with the plurality of energy consuming devices 106. Each of the plurality of energy consuming devices 106 performs an operation of a plurality of operations inside the built environment 102. The plurality of energy consuming devices 106 may be of any type and size. Examples of the plurality of energy consuming devices 106 include air conditioners, de-humidifiers, elevators, escalators, mobile phone, laptop and the like. In addition, the plurality of energy consuming devices 106 consumes a pre-defined amount of the energy based on power rating, duration of the energy usage and type of the operation. For example, a laptop consumes a lower amount of energy compared to an escalator that carries the plurality of users 104.

In addition, each user of the plurality of users 104 shares a portion of the pre-defined amount of the energy consumption associated with each of the plurality of energy consuming devices 106. The plurality of energy consuming devices 106 may be electrical, mechanical, fixed, portable and variable. In addition, the plurality of energy consuming devices may be related or unrelated to the plurality of operations of the built environment 102. The pre-determined amount of the energy consumed by the plurality of energy consuming devices is based on a plurality of variables. The plurality of variables includes current, voltage, power, thermal loss, device size and the power rating.

Further, in an embodiment of the present disclosure, each of the plurality of energy consuming devices 106 is associated with a plurality of metering devices. The plurality of metering devices measures each of the plurality of variables in real time. The plurality of metering devices 106 includes digital multi-meters, current sensors, wattage meters and the like. In addition, the plurality of metering devices enables collection of the first set of statistical data.

Furthermore, in another embodiment of the present disclosure, the plurality of energy consuming devices 106 is associated with a pre-defined number of the plurality of users 104. The pre-defined number of the plurality of users 104 conduct interview with one or more users performing the plurality of operations of the plurality of energy consuming devices 106. The pre-defined number of users 104 records the interview of the one or more users in an interview form. The interview form is captured to obtain a digital photograph. The digital photograph is assimilated and recorded in the first set of statistical data. In an embodiment of the present disclosure, the assimilation involves collection of a second portion of statistical data digitally from each of the plurality of energy consuming devices 106. In another embodiment of the present disclosure, the assimilation involves the collection of the second portion of the statistical data physically from each of the plurality of energy consuming devices 106.

In addition, the system 100 segregates the first set of statistical data. The segregation of the first set of statistical data is based on the one or more operational characteristics. In addition, the segregation of the first set of statistical data is based in the one or more physical characteristics. Further, the one or more operational characteristics includes operating voltage, running load amperage, full load amperage, wattage, voltage and frequency. Moreover, the one or more operational characteristics include operating temperature and flow rates. Further, the one or more physical characteristics include size, dimensions, packaging, shape and typical energy usage of each of the plurality of energy consuming devices 106.

In addition, the second set of statistical data is obtained from observations and access tools to determine an energy usage pattern of the plurality of energy consuming devices 106. Further, the pre-defined amount of the energy consumed by each of the plurality of users 104 is derived through an occupancy pattern of each of the plurality of users 104. The occupancy pattern of each of the plurality of users 104 is stored in the second set of statistical data. For example, each user of the plurality of users 104 in a hotel arrives and leaves the hotel for certain hours each day. In addition, the user carries a mobile phone. The occupancy pattern of the plurality of users 104 present in the hotel is recorded based on one or more sensing tools. The one or more sensing tools include time logs, entry systems, visitor logs and RFID tags. In addition, the one or more sensing tools include occupancy sensors, self-recording and data reporting systems.

Further, the usage pattern of each of the plurality of energy consuming devices 106 is derived from access to disparate information about the plurality of users 104. In addition, the energy usage pattern is measured for a pre-defined time interval spent by the plurality of users 104 in the built environment 102. In an embodiment of the present disclosure, the energy usage involves recharge of a battery associated with the plurality of energy consuming devices 106. In another embodiment of the present disclosure, the energy usage involves a direct use of the supply system of the built environment 102. Furthermore, the first set of statistical data and the second set of statistical data are transferred to the one or more data collecting device 108. The one or more data collecting devices 108 is configured to collect and transfer the first set of statistical data and the second set of statistical data to the communication network 110.

Furthermore, the pre-defined number of the plurality of users 104 is associated with the one or more data collecting devices 108. In addition, each of the one or more data collecting devices 108 is a portable device with an inbuilt application program interface (hereafter "API"). The inbuilt API of each of the one or more data collecting device 108 is associated with a Global Positioning System (hereafter "GPS"), a camera and a keypad. The keypad and the camera enable the pre-defined number of the plurality of users 104 to collect the first set of statistical data through manual input. The camera provides images of bills, images of the plurality of energy consuming devices 106 and the images of the interview forms. In addition, the GPS provides the real time physical location of the pre-defined number of users 104.

Moreover, the GPS provides the real time physical location of each of the plurality of energy consuming devices. The one or more data collecting devices 108 run based on a statistical collection model. The statistical collection model joins one or more data points from the first set of statistical data and the second set of statistical data. The statistical collection model ascertains a probability of accuracy from comparisons of different answer to same questions or different questions designed to arrive at same answer.

The collection of the first set of statistical data and the second set of statistical data is performed through a distributed audit process. The distributed audit process enables collection and analysis of the first set of statistical data and the second set of statistical data corresponding each of the plurality of energy consuming devices and each of the plurality of users 104. In addition, the distributed audit process is applicable for data collection across multiple platforms. The distributed audit process when divided up across a distributed digital platform enables cost effective and relatively faster means of collection of the first set of statistical data and the second set of statistical data.

Each of the one or more data collecting devices 110 may be a mobile device. The mobile device is associated with a user that is responsible for collecting a portion of the first set of statistical data and the second set of statistical data. The mobile device is enabled with a camera, a keypad or keyboard, a global positioning system (GPS), text and data entry application and the like. The user assigned to collect the first set of statistical data and the second set of statistical data may use the mobile device to capture images and nameplate information of each of the plurality of energy consuming devices. In addition, the user may use the mobile device to schedule, record, identify, transfer or tag information related to the identity, usage and location of the plurality of energy consuming devices. The user may tag the images or any records with metadata for current and future analysis of the first set of statistical data and the second set of statistical data.

The mobile device may include one or more mobile applications that are configured to search and display the metadata associated with images and records, captured images, text and the like. The mobile device application installed with the one or more mobile applications may enable any user or any optical reader devices to capture key information about each analyzed energy consuming device. In addition, the metadata for captured images may be added later or remotely by any user.

The metadata and captured key information may be analyzed by an analysis tool of the prediction system 114. The metadata is sorted, categorized, prioritized and applied to calculations of probabilistic score and performance parameters of the built environment. The metadata and the captured key information in the form of first set of statistical data is used to display and generate charts, graphs, tables and other forms of data output. The generated results may be viewed and analyzed by any third party user present inside or outside of the built environment 102.

The prediction system 114 may transfer the analyzed data of the analysis engine to a manipulation engine. The manipulation engine enables display of organized results and the first set of statistical data on a presentation platform for recommendation and review of supervisors of the built environment 102.

Further, the one or more data collecting devices 108 is associated with the communication network 110 through an internet connection. The internet connection is established based on a type of communication network 110. In an embodiment of the present disclosure, the type of communication network 110 is a wireless mobile network. In another embodiment of the present disclosure, the type of communication network 110 is a wired network with a finite bandwidth. In yet another embodiment of the present disclosure, the type of communication network 110 is a combination of the wireless and the wired network for the optimum throughput of data transmission. In yet another embodiment of the present disclosure, the type of communication network 110 network is an optical fiber high bandwidth network that enables a high data rate with negligible connection drops. The communication network 112 includes a set of channels. Each channel of the set of channels supports a finite bandwidth.

Moreover, the finite bandwidth of each channel of the set of channels is based on capacity of the communication network 110. The communication network 110 is configured to transmit a pre-determined size of the first set of statistical data and the second set of statistical data. The first set of statistical data and the second set of statistical data are transferred at a pre-defined rate to the recommendation system 112 (as explained below in the detailed description of the FIG. 2).

In addition, the recommendation system 112 fetches the pre-determined size of the second set of statistical data in the real time (as described below in the detailed description of the FIG. 2). In addition, the recommendation system 112 collects the third set of statistical data from a plurality of sources. The plurality of sources includes the plurality of external APIs 114 and the one or more third party databases 116. The plurality of external APIs 114 is configured to collect, store and transmit the third set of statistical data. The plurality of external APIs 114 provides weather history data, weather forecasts data, energy consumption data and billing data.

Further, the plurality of external APIs 114 provides metered energy data, financial business data and non-financial business data. Moreover, the financial business data and the non-financial business data come from business management software (as explained below in the detailed description of the FIG. 2). Further, the recommendation system 112 performs analysis of the first set of statistical data, the second set of statistical data and the third set of statistical data. The analysis is performed to obtain an energy consumption pattern of each of the plurality of energy consuming device 106 (as stated below in the detailed description of the FIG. 2).

Moreover, the recommendation system 112 recommends the one or more potential changes in the operating parameters of the plurality of energy consuming devices 106 inside the built environment 102. The one or more potential changes pertain to the energy consumption of each of the plurality of energy consuming devices 106 present inside the built environment 102 (as explained below in the detailed description of the FIG. 2). Further, the recommendation system 112 displays the first set of statistical data, the second set of statistical data, the third set of statistical data and the one or more potential changes on the one or more monitoring devices 118 (as mentioned below in the detailed description of the FIG. 2).

Furthermore, it may be noted that in FIG. 1, the built environment 102 is connected to the recommendation system 112 through the communication network 110; however, those skilled in the art would appreciate that more number of built environments are connected to the recommendation system 112 through the communication network 110. In addition, it may be noted that in FIG. 1, the one or more monitoring devices 118 are associated with the user 118a; however, those skilled in the art would appreciate that the one or more monitoring devices 118 are associated with one or more number of users.

Figure 2:
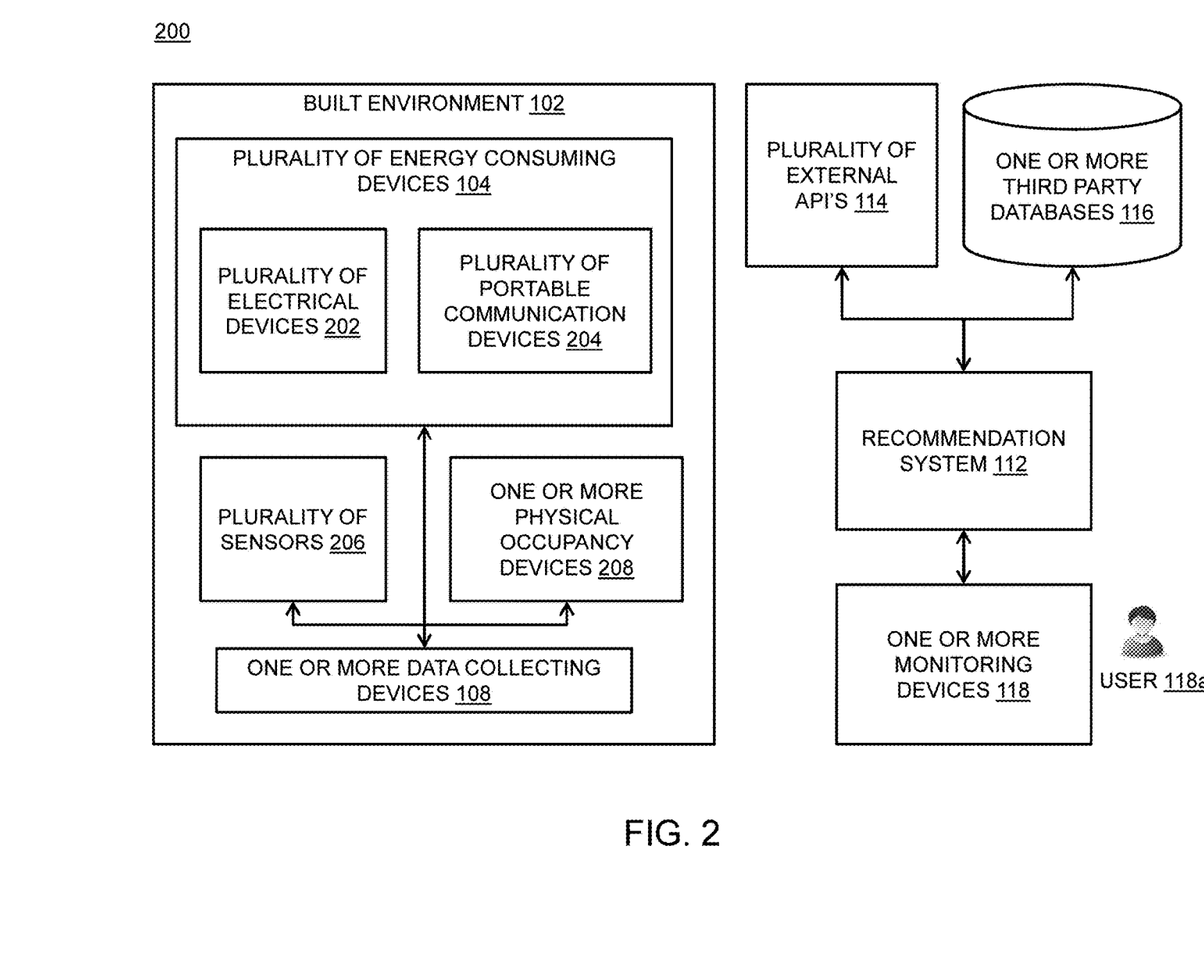
FIG. 2 illustrates a block diagram to recommend the one or more potential changes in the operating parameters of the plurality of energy loads inside the built environment, in accordance with various embodiments of the present disclosure.

FIG. 2 illustrates a block diagram 200 to recommend the one or more potential changes in the operating parameters of the plurality of energy load sources, in accordance with various embodiments of the present disclosure. It may be noted that to explain the system elements of the FIG. 2, references will be made to the system elements of the FIG. 1.

Further, the block diagram 200 describes an optimized energy load recommendation system. The block diagram 200 includes the built environment 102, the recommendation system 112, the plurality of external APIs 114, the one or more third party databases 116 and the one or more monitoring devices 118. The above mentioned components provide the one or more potential changes for optimization of the energy consumption. The energy consumption requirement inside the built environment 102 is obtained from the plurality of resources (as exemplary stated above in the detailed description of the FIG. 1).

Furthermore, the built environment 102 includes the plurality of energy consuming devices 106, a plurality of sensors 206, one or more physical occupancy devices 208 and the one or more data collecting devices 108. Further, the plurality of energy consuming devices 106 includes a plurality of electrical devices 202 and a plurality of portable communication devices 204. The plurality of electrical devices 202 is associated with the plurality of the operations of the built environment (as stated above earlier in the detailed description of the FIG. 1). Further, the plurality of electrical devices 202 may be electrical, electromechanical, fixed, portable and variable. Moreover, the plurality of electrical devices may be related or unrelated to the structure of the built environment 102. Further, each of the plurality of the electrical devices 202 is associated with a plurality of variables. The plurality of variables defines the energy consumption in the real time based on the load.

Moreover, the system 100 records the first set of statistical data from the plurality of variables associated with the energy consumption of the plurality of electrical devices 202. In an embodiment of the present disclosure, each of the plurality of electrical devices 202 is associated with the plurality of metering devices. The plurality of metering devices digitally measures each of the plurality of variables in the real time. The plurality of metering devices includes one or more digital meters, one or more digital current and voltage sensors, the multi-meters, watt-meters, supervisory control and data acquisition (SCADA) and the like.

Furthermore, in another embodiment of the present disclosure, the plurality of electrical devices 202 is assigned the pre-defined number of users of the plurality of users 104 (as described above in the detailed description of the FIG. 1). In yet another embodiment of the present disclosure, each of the plurality of electrical devices 202 possesses an embedded device. Moreover, the embedded device displays the information related to the energy usage pattern of each of the plurality of electrical devices 202. In an example, a photocopy machine possesses a copy counter to display the number of times the image is reproduced. In another example, a pump motor or factory motor possesses a revolution counter or an hour counter to display operating life. In yet another example, the air conditioner possesses a management computer or software system to record behavior.

Furthermore, the system 100 segregates the first set of statistical data from each of the plurality of electrical devices 202 (as explained above in the detailed description of the FIG. 1). Furthermore, the energy usage pattern of the plurality of users 104 includes measurement of the physical location of each of the plurality of users 104. In addition, the energy usage pattern of the plurality of users 104 includes identification of each portable communication device of the plurality of portable communication devices 204. Example of the plurality of the portable communication devices 204 includes but may not be limited to the mobile phone, personal digital assistant (PDA), music player and the laptop.

Moreover, the energy consumption of each of the plurality of portable communication devices 108 is derived from the information present disparately about each of the plurality of users 104 (as exemplary stated above in the detailed description of the FIG. 1). For example, an office worker brings the laptop to the office each day and carries the laptop home each night. The office worker enters and leaves the office at different times each day and different days each week. The energy usage of the laptop in the office is derived from the office worker time stamped schedule of entry and leave. The energy usage is multiplied to obtain the energy consumption associated with each portable communication device of the plurality of portable communication devices 204.

In addition, the system 100 derives the second set of statistical data from changes in the energy consumption of each of the plurality of portable communication devices 204. The changes in the energy consumption are based on age and purpose of each of the plurality of portable communication device 204. In an example, the amount of the energy consumption for the laptop with heavy graphics design programs and engineering cad software is different from the laptop used for an email or a word function. In addition, the first set of statistical data is derived from the one or more ambient parameters inside the built environment 102. The one or more ambient parameters are measured by the plurality of sensors 206. The plurality of sensors 206 includes temperature sensor, humidity sensor, pressure sensor, sound sensors, vibration sensors, Passive Infrared sensors (hereafter "PIR"), proximity sensors and the like.

Further, the system 100 collects the real time occupancy pattern and the occupancy behavior for each of the plurality of users 104. The real time occupancy pattern is derived from the one or more physical occupancy devices 208. Moreover, the one or more physical occupancy devices 208 records and counts each of the plurality of users 104 present inside the built environment 102. Examples of the one or more physical occupancy devices 208 includes but may not be limited to radio frequency identification (RFID) tags, time logs, entry system, visitor logs and occupancy sensors. In addition, the one or more physical occupancy devices 208 record and count based on the one or more specifications.

Furthermore, the one or more specifications include heat signature, identification cards, Bluetooth and the like. In an embodiment of the present disclosure, the record of first time visitors and frequent visitors is maintained for faster collection of the second set of statistical data. Further, the energy usage pattern of each of the plurality of users 104 creates a randomized consumption of the energy. The randomized consumption of the energy is based on a variation in number of the plurality of users 104. The variation in the number of the plurality of users 104 is based on days, months, seasons, events and time of year.

Moreover, the one or more data collecting devices 110 collects the statistical data digitally and manually (as explained above in the detailed description of FIG. 1). Further, the one or more data collecting devices 110 are associated with a network through the internet connection (as stated above in the detailed description of FIG. 1). The network is configured to transmit the pre-determined size of the first set of statistical data and the second set of statistical data to the recommendation system 112. The plurality of external APIs 116 is associated with the third set of statistical data. The plurality of external APIs 116 includes a weather API and a utility history API. In addition, the weather API performs the collection, the storage and the transfer of the weather conditions associated with each day and time of the year. The utility history API performs storage and transfer of the past energy consumption data of the built environment 102.

Further, the recommendation system 112 fetches the predetermined size of the first set of statistical data in the real time. The first set of statistical data is based on the first plurality of parameters. The first plurality of parameters includes the one or more physical characteristics and the one or operational characteristics (as mentioned above in the detailed description of the FIG. 1).

Further, the one or more operational characteristics include power rating, current energy usage based on load, voltage, frequency, phase, energy efficiency and thermal efficiency. In addition, the one or more operating characteristics include the cost associated with the plurality of operations and the duration of the energy usage. Moreover, the one or more operational characteristics include a seasonal variation in the energy consumption and an off-seasonal variation in the energy consumption. The cost associated with the plurality of operations pertains to the energy consumption of each of the plurality of energy consuming devices. The one or more physical characteristics include the size, the physical location, temperature, weight and portability. In addition, the one or more physical characteristics include type of device based on mechanical and electrical parts.

In addition, the recommendation system 112 fetches the pre-determined size of the second set of statistical data in the real time. The second set of statistical data is based on the second plurality of parameters. The second plurality of parameters includes the occupancy behavior of the plurality of users 104 and the energy consumption pattern. Moreover, the second plurality of parameters includes the physical location of the each of the plurality of users 104 and the duration of energy usage associated with the energy consuming device. In addition, the duration of the energy usage pertains to the plurality of users 104. Further, the second plurality of parameters includes the seasonal variation and the off-seasonal variation in the real time occupancy pattern of the plurality of users 104. Furthermore, the recommendation system 112 collects the third set of statistical data from the plurality of sources. The plurality of sources includes the plurality of external APIs 114 and the one or more third party databases 116. The plurality of external APIs 114 is configured to collect, store and transmit the third set of statistical data. The plurality of external APIs 114 provides the weather history data, the weather forecasts data, the energy consumption data and the billing data (as provided in the detailed description of the FIG. 1).

In addition, the plurality of external APIs 114 provides the metered energy data, the financial business data and the non-financial business data. Moreover, the financial business data and the non-financial business data come from the business management software. The business management software is Enterprise Resources Planning (hereafter "ERP") software. The recommendation system 112 polls and collects from the communication network 112 through timed data polls. In addition, the recommendation system 112 polls and collects from plurality of external API's 114 and the one or more third party databases 116. The timed data polls are programmed based on batch calendar schedule and manual requests. In addition, the timed data polls are programmed based on the real-time transfer of the first set of statistical data, the second set of statistical data and the third set of statistical data.

Further, the recommendation system 112 performs the analysis of the first set of statistical data, the second set of statistical data and the third set of statistical data. The analysis is performed to obtain the energy consumption pattern of each of the plurality of energy consuming device 106. The analysis is performed for the recognition of the one or more data points from the first set of statistical data, the second set of statistical data and the third set of statistical data. In addition, the analysis is performed against a plurality of factors. The plurality of factors includes base load, variable load and the cost associated with the plurality of operations.

Moreover, the plurality of factors includes power consumption and the duration of the energy usage. Further, the plurality of factors includes a peak energy demand, average consumption of energy during a specific period and the real time occupancy pattern of each of the plurality of users 104. Further, the plurality of factors includes the energy demand based on seasonal variations in the energy usage and off-seasonal variations in the energy usage. Furthermore, the plurality of factors includes the energy usage based on weather conditions.

Furthermore, the recommendation system 112 performs the analysis by application of a statistical regression and an extrapolation of the energy consumption behavior. Moreover, the analysis of the energy consumption behavior is associated with each of the plurality of energy consuming devices. In addition, the analysis is performed to obtain a classification of energy efficient and energy inefficient devices from the plurality of energy consuming devices 106.

Moreover, the recommendation system 112 recommends the one or more potential changes in the operating parameters. The one or more potential changes pertain to the energy consumption of each of the plurality of energy consuming devices 106 present inside the built environment 102. The one or more potential changes include replacement of the energy consuming device with a known energy consuming device. The known energy consuming device bears a higher percentage of the energy efficiency. In addition, the one or more potential changes pertain to the energy consumption of each of the plurality of energy consuming devices 106.

Further, the one or more potential changes include regulation of the duration of the energy usage of the plurality of energy consuming devices. Moreover, the one or more potential changes include regulation of supply system for each of the plurality of energy consuming devices 106. The regulation is based on the occupancy pattern of the plurality of users 104. In addition, the one or more potential changes suggest a control system with feedback to control the operations and a cost effective device upgrade. In addition, the one or more potential changes suggest a list of malfunctioning devices of the plurality of energy consuming devices 106. In addition, recommendation system 112 recommends based on the analysis of the one or more data points. The recommendation is performed to improve the energy consumption behavior associated with each of the plurality of energy consuming devices 106. In addition, the recommendation system 112 prompts the plurality of users 104 to apply the one or more potential changes.

Furthermore, the recommendation system 112 provides the improvement in the recommendations of the one or more potential changes. The improvement in the recommendations is obtained from a learning algorithm. The learning algorithm accelerates assessment and the analysis of the one or more data points. The one or more data points associate with the energy consumption of each of the plurality of energy consuming devices 106 present in the built environment 102.

Moreover, the recommendation system 112 updates the first set of statistical data, the second set of statistical data and the third set of statistical data. In addition, the recommendation system 112 updates the one or more potential changes. The first set of statistical data, the second set of statistical data and the third set of statistical data is updated in the real time. Moreover, the one or more potential changes are updated in the real time.

In addition, the recommendation system 112 stores the first set of statistical data, the second set of statistical data and the third set of statistical data. In addition, the recommendation system 112 stores the one or more potential changes. The first set of statistical data, the second set of statistical data and the third set of statistical data is stored in the real time. Moreover, the one or more potential changes are stored in the real time.

Further, the recommendation system 112 displays the first set of statistical data, the second set of statistical data and the third set of statistical data. In addition, the recommendation system 112 displays the one or more potential changes on each of the one or more monitoring devices 118. The one or more monitoring devices 118 are associated with each of the plurality of users 104 associated with the built environment 102.

Further, the recommendation system 112 displays the first set of statistical data, the second set of statistical data, the third set of statistical data and the one or more potential changes on the one or more monitoring devices 118. The one or more monitoring devices 118 receive and display the first set of statistical data, the second set of statistical data and the third set of statistical data. In addition, the one or more monitoring devices 118 receive and display the one or more potential changes for proper monitoring and regulation. The one or more monitoring devices 118 may be any fixed or portable device. Furthermore, the one or more monitoring devices 118 are associated with a user 118a. The user 118a monitors, edits and evaluates the first set of statistical data and the second set of statistical data. In addition, the user 118a monitors, edits and evaluates the third set of statistical data and the one or more potential changes. The user 118a informs authorities about the changes required in the energy consumption.

For example, lighting devices present in the built environment 102 may be driven by a daylight sensor. The daylight sensor controls the lighting devices by automatically switching on when ambient light drops below a specific value. The daylight sensor turns off the lighting devices when the ambient light exceeds the specific value. Further, seasonal daylight hours for the physical location are included as a reference.

Figure 3:
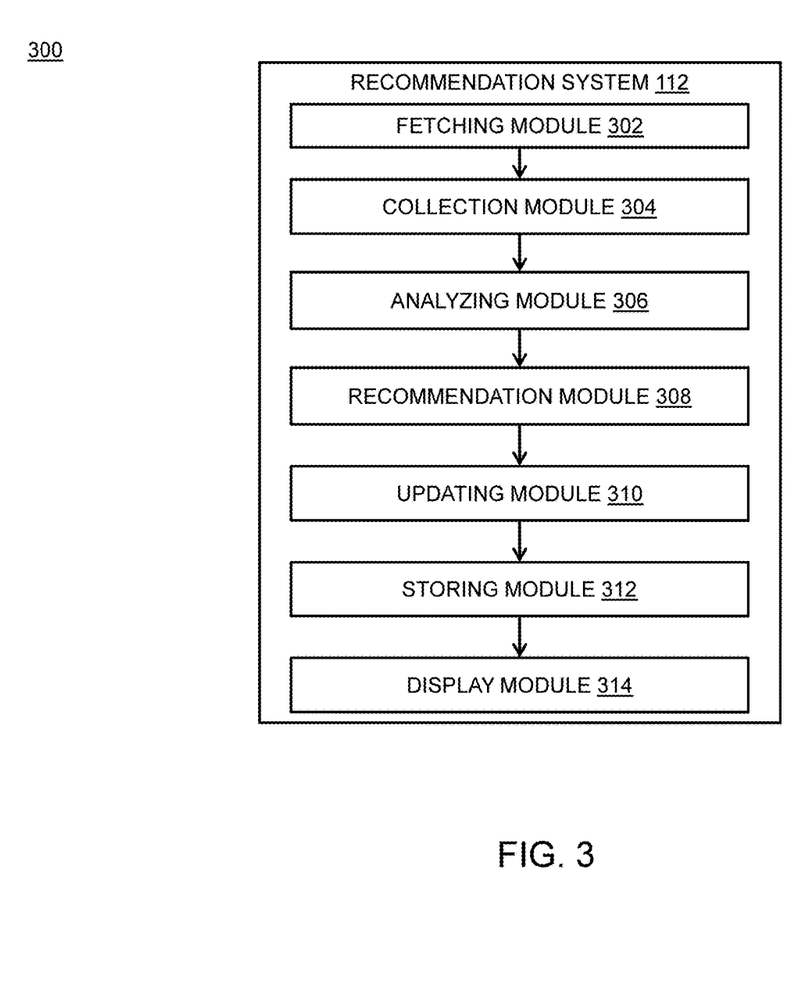
FIG. 3 illustrates a block diagram of a recommendation system, in accordance with various embodiments of the present disclosure.

FIG. 3 illustrates a block diagram 300 of the recommendation system 112 for the improvement in the energy consumption, in accordance with various embodiments of the present disclosure. It may be noted that to explain the system elements of the FIG. 3, references will be made to the system elements of the FIG. 1 and the FIG. 2. The recommendation system 112 is configured to fetch, collect, analyze and recommend the one or more potential changes for the improvement in the energy consumption of the built environment 102.

Further, the block diagram 300 includes the recommendation system 112. The recommendation system 112 includes a fetching module 302, a collection module 304, an analyzing module 306, a recommendation module 308, an updating module 310, a storing module 312 and a display module 314. The above mentioned modules are configured to derive the one or more potential changes for the improvement in energy management of the built environment 102.

Furthermore, the fetching module 302 is configured to fetch the first set of statistical data associated with each of a plurality of energy consuming devices 106 present inside the built environment 102. In addition, the fetching module 302 fetches the second set of statistical data. The second set of statistical data pertains to each of the plurality of users 104 present inside the built environment 102 (as explained above in the detailed description of the FIG. 2). Moreover, the collection module 304 is configured to collect the third set of statistical data. In addition, the third set of statistical data is associated with the one or more ambient parameters of the built environment. The one or more ambient parameters include the temperature, the humidity, the daylight and the like. The collection module 304 collects the weather conditions and the past energy consumption data from the one or more sources (as exemplary stated above in the detailed description of the FIG. 2).

Further, the analyzing module 306 is configured to analyze the first set of statistical data, the second set of statistical data and the third set of statistical data. The analysis is performed to obtain the energy consumption pattern of each of the plurality of energy consuming devices 106 present inside the built environment 102 (as previously described above in the detailed description of the FIG. 2).

Furthermore, the analyzing module 306 parses the first set of statistical data, the second set of statistical data and the third set of statistical data for a pre-defined period of time. The one or more data points for the analysis includes interview results, the energy usage records of plurality of energy consuming devices 106 and the database. In addition, the one or more data points for the analysis includes the physical location of each of the plurality of energy consuming devices 108 in the built environment 102 and the occupancy pattern of the plurality of users 104. Moreover, the one or more data points for the analysis includes a plurality of physical parameters of the built environment 102, the weather conditions, the daylight and the past energy consumption data. Further, the analyzing module 306 utilizes an algorithm to detect word and number characters. The algorithm reduces length of the first set of statistical data, the second set of statistical data and the third set of statistical data.

In addition, the analyzing module 306 analyzes the images associated with the plurality of energy consuming devices 106. The analysis of the images identifies the type of the energy consuming device, model and manufacturer. The manufacturer and the model of the energy consuming device are derived from comparison of the images with a known database. The known database stores the information related to the plurality of energy consuming devices 106. The images provide future recognition of the plurality of energy consuming devices 106. In addition, the analyzing module 306 is a self-learning module. The analyzing module 306 speeds up the fetching process of the first set of statistical data and the second set of statistical data. The speed up is achieved from auto fulfill of the one or more data points of the plurality of energy consuming devices 106 recognized in the database.

Further, the analyzing module 306 uses a statistical formula to determine the energy usage based on the load and the energy demand of the built environments 102. Accordingly, the analyzing module 306 generates the plurality of statistical results based on the statistical formula. The plurality of statistical results include a table and chart of monthly energy consumption of the built environment 102 and the table of a total monthly variable energy load. Further, the plurality of statistical results includes a statistical correlation between the energy consumption and the temperature for cooling degree days and heating degree days. Moreover, the plurality of statistical results includes a pie chart of a separation of the energy usage in the built environment 102 and the table of the energy consumption per month. Furthermore, the plurality of statistical results includes the load based on the air conditioner and the statistical chart of a kWh consumption based on the load type and a bar graph of expected air conditioner cost savings. In addition, the plurality of statistical results include rental cost, the statistical chart of total kWh consumed per room as a function of the cold degree days and the like.

Going further, the recommendation module 308 is configured to recommend the one or more potential changes in the operating parameters. The one or more changes pertain to the energy consumption of each of the plurality of energy consuming devices 106 present inside the built environment 102 (as described above in the detailed description of the FIG. 2). Moreover, the recommendation associated with the improvement in future energy consumption is based on the temperature, the weather conditions and the energy usage pattern. In an example, the temperature reference is adjusted for average temperature during a specific month. The recommendation module 308 enables display of the one or more changes in the energy usage for the specific month. In another example, the operating behavior of each of the plurality of energy consuming device 106 is regulated based on the occupancy pattern. In yet another example, the plurality of users 104 brings the laptop for an average total of 170 hours per month. The recommendation module 308 provides a pre-defined percentage of discount factors for the specific period of no charger connection with the power supply system.

In yet another example, the recommendation module 308 suggests installation of the control system. The control system automates an adjustment of the lighting devices and the air conditioners based on the real-time occupancy pattern. Also, the control system reduces operating time of the lighting devices and the air conditioners. The recommendation module 308 collects each of the plurality of statistical results to compare against the cost of implementation of the one or more potential changes. The recommendation module 314 performs comparison against the cost to implement measures with best potential return. The in addition, the recommendation module 308 enables the prompt delivery of the first set of statistical data, the second set of statistical data, the third set of statistical data and the one or more potential changes.

Further, the updating module 310 is configured to update the first set of statistical data, the second set of statistical data and the third set of statistical data. In addition, the updating module 310 updates the one or more potential changes. The first set of statistical data, the second set of statistical data and the third set of statistical data is updated in the real time. Moreover, the one or more potential changes are updated in the real time.

Further, the storing module 312 is configured to store the first set of statistical data, second set of statistical data and the third set of statistical data. In addition, the storing module 312 stores the one or more potential changes. The first set of statistical data, the second set of statistical data and the third set of statistical data is stored in the real time. Moreover, the one or more potential changes are stored in the real time.

Moreover, the display module 314 is configured to display the first set of statistical data, the second set of statistical data and the third set of statistical data. In addition, the display module 314 displays the one or more potential changes on each of the one or more monitoring devices 118. The one or more monitoring devices 118 are associated with each of the plurality of users 118 associated with the built environment 102 (as described above in the detailed description of FIG. 1).

Figure 4:
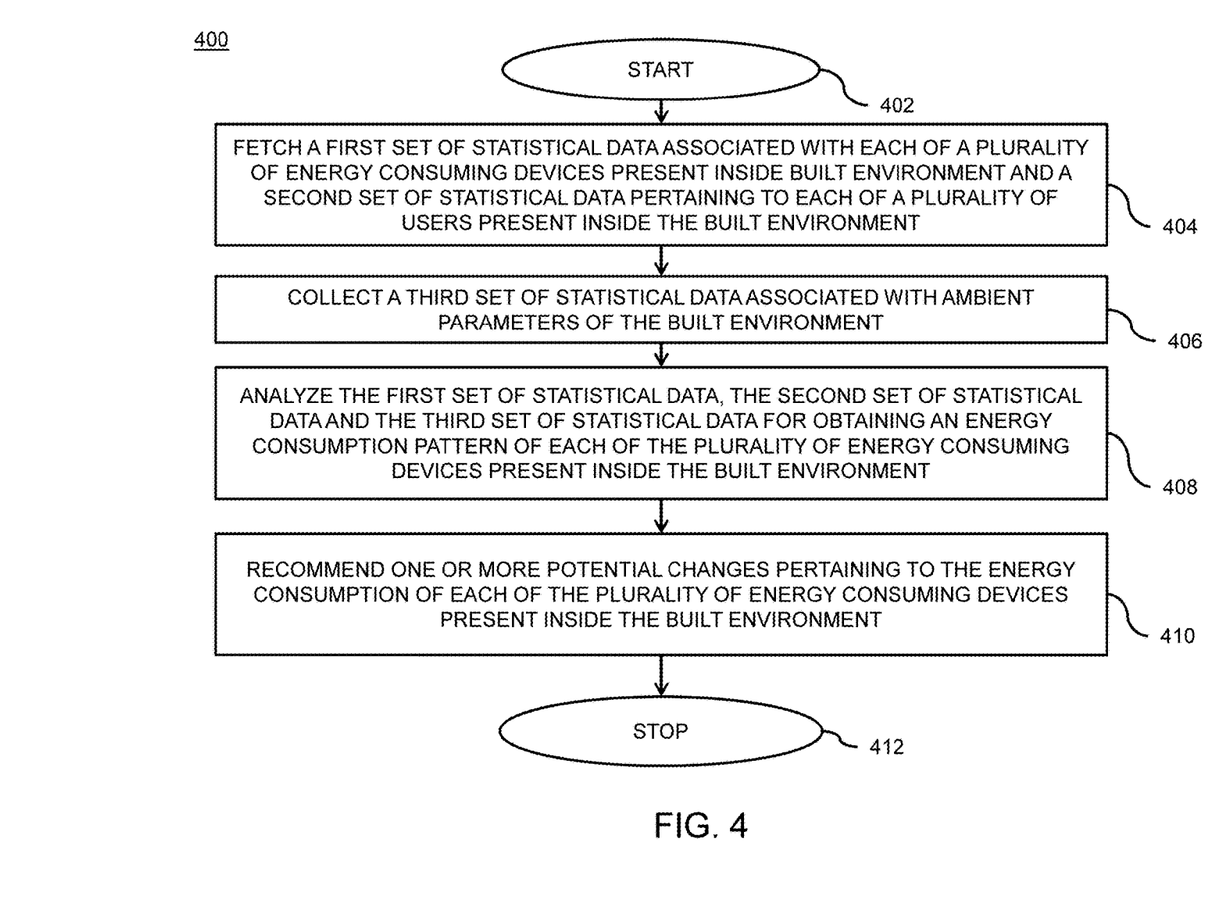
FIG. 4 illustrates a flow chart to recommend the one or more potential changes in the operating parameters of the plurality of energy loads inside the built environment, in accordance with various embodiments of the present disclosure.

FIG. 4 illustrates a flowchart 400 for recommendation of the one or more potential changes in the energy consumption inside the built environment, in accordance with various embodiments of the present disclosure. It may be noted that to explain the process steps of the flowchart 400, references will be made to the system elements of the FIG. 1, the FIG. 2 and the FIG. 3. It may also be noted that the flowchart 400 may have lesser or more number of steps.

The flowchart 400 initiates at step 402. Following step 402, at step 404, the fetching module 302 fetches the first set of statistical data associated with each of the plurality of energy consuming devices 106. In addition, the fetching module 302 fetches the second set of statistical data associated with each of the plurality of users 104. At step 406, the collection module 304 collects the third set of statistical data associated with the one or more ambient parameters of the built environment 102. At step 408, the analyzing module 306 analyzes the first set of statistical data, the second set of statistical data and the third set of statistical data. In addition, the analysis is performed to obtain the energy consumption pattern of each of the plurality of energy consuming devices 106 present inside the built environment 102. At step 410, the recommendation module 308 recommends the one or more potential changes. In addition, the one or more potential changes are associated with the energy consumption of each of the plurality of energy consuming devices 106. The flow chart 400 terminates at step 412.

Figure 5:
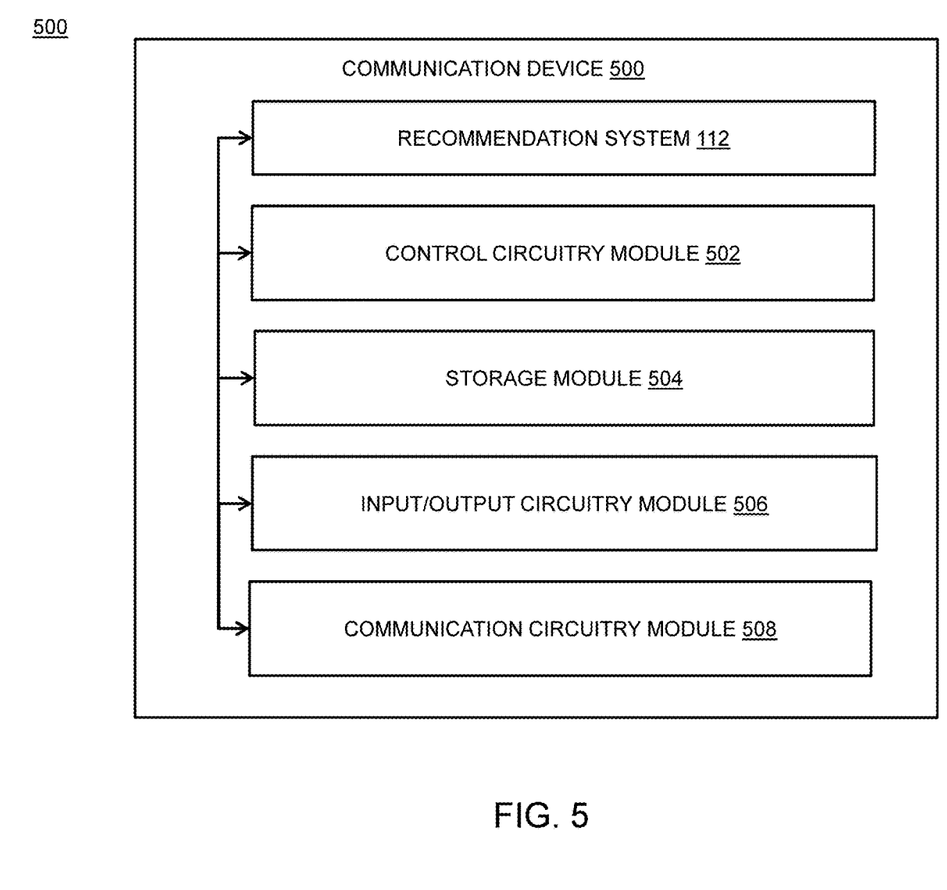
FIG. 5 illustrates a block diagram of a communication device, in accordance with various embodiments of the present disclosure.

FIG. 5 illustrates a block diagram 500 of a communication device, in accordance with various embodiments of the present disclosure. The communication device enables host process of the recommendation system 112. The communication device includes a control circuitry module 502, a storage module 504, an input/output circuitry module 506, and a communication circuitry module 508. The communication device includes any suitable type of portable electronic device. The communication device includes but may not be limited to a personal email device (e.g., a Blackberry™ made available by Research in Motion of Waterloo, Ontario), a personal data assistant ("PDA"), a cellular telephone. In addition, the communication device includes a smartphone, the laptop, computer and the tablet. In another embodiment of the present disclosure, the communication device can be a desktop computer.

From the perspective of this disclosure, the control circuitry module 502 includes any processing circuitry or processor operative to control the operations and performance of the communication device. For example, the control circuitry module 502 may be used to run operating system applications, firmware applications, media playback applications, media editing applications, or any other application.

In an embodiment of the present disclosure, the control circuitry module 502 drives a display and process inputs received from the user interface. From the perspective of this disclosure, the storage module 504 includes one or more storage mediums. The one or more storage medium includes a hard-drive, solid state drive, flash memory, permanent memory such as ROM, any other suitable type of storage component, or any combination thereof. The storage module 504 may store, for example, media data (e.g., music and video files), application data (e.g., for implementing functions on the communication device).

From the perspective of this disclosure, the I/O circuitry module 506 may be operative to convert (and encode/decode, if necessary) analog signals and other signals into digital data. In an embodiment of the present disclosure, the I/O circuitry module 506 may convert the digital data into any other type of signal and vice-versa. For example, the I/O circuitry module 506 may receive and convert physical contact inputs (e.g., from a multi-touch screen), physical movements (e.g., from a mouse or sensor), analog audio signals (e.g., from a microphone), or any other input. The digital data may be provided to and received from the control circuitry module 502, the storage module 504, or any other component of the communication device.

It may be noted that the I/O circuitry module 506 is illustrated in FIG. 5 as a single component of the communication device; however those skilled in the art would appreciate that several instances of the I/O circuitry module 506 may be included in the communication device.

The communication device may include any suitable interface or component for allowing the user to provide inputs to the I/O circuitry module 506. The communication device may include any suitable input mechanism. Examples of the input mechanism include but may not be limited to a button, keypad, dial, a click wheel, and a touch screen. In an embodiment, the communication device may include a capacitive sensing mechanism, or a multi-touch capacitive sensing mechanism.

In an embodiment of the present disclosure, the communication device may include specialized output circuitry associated with output devices such as, for example, one or more audio outputs. The audio output may include one or more speakers built into the communication device, or an audio component that may be remotely coupled to the communication device.

The one or more speakers can be mono speakers, stereo speakers, or a combination of both. The audio component can be a headset, headphones or ear buds that may be coupled to the communication device with a wire or wirelessly.

In an embodiment, the I/O circuitry module 506 may include display circuitry for providing a display visible to a user. For example, the display circuitry may include a screen (e.g., an LCD screen) that is incorporated in the communication device.

The display circuitry may include a movable display or a projecting system for providing a display of content on a surface remote from the communication device (e.g., a video projector). In an embodiment of the present disclosure, the display circuitry may include a coder/decoder to convert digital media data into the analog signals. For example, the display circuitry may include video Codecs, audio Codecs, or any other suitable type of Codec.

The display circuitry may include display driver circuitry, circuitry for driving display drivers or both. The display circuitry may be operative to display content. The display content can include media playback information, application screens for applications implemented on the electronic device, information regarding ongoing communications operations, information regarding incoming communications requests, or device operation screens under the direction of the control circuitry module 502. Alternatively, the display circuitry may be operative to provide instructions to a remote display.

In addition, the communication device includes the communication circuitry module 508. The communication circuitry module 508 may include any suitable communication circuitry operative to connect to a communication network.

In addition, the communication circuitry module 508 may include any suitable communication circuitry to transmit communications (e.g., voice or data) from the communication device to other devices. The other devices exist within the communications network. The communications circuitry 508 may be operative to interface with the communication network through any suitable communication protocol. Examples of the communication protocol include but may not be limited to Wi-Fi, Bluetooth RTM, radio frequency systems, infrared, LTE, GSM, GSM plus EDGE, CDMA, and quadband.

In an embodiment, the communications circuitry module 508 may be operative to create a communications network using any suitable communications protocol. For example, the communication circuitry module 508 may create a short-range communication network using a short-range communications protocol to connect to other devices. For example, the communication circuitry module 508 may be operative to create a local communication network using the Bluetooth, RTM protocol to couple the communication device with a Bluetooth, RTM headset.

It may be noted that the computing device is shown to have only one communication operation; however, those skilled in the art would appreciate that the communication device may include one more instances of the communication circuitry module 508 for simultaneously performing several communication operations using different communication networks. For example, the communication device may include a first instance of the communication circuitry module 508 for communicating over a cellular network, and a second instance of the communication circuitry module 508 for communicating over Wi-Fi or using Bluetooth RTM.

In an embodiment of the present disclosure, the same instance of the communications circuitry module 508 may be operative to provide for communications over several communication networks. In another embodiment of the present disclosure, the communication device may be coupled to a host device for data transfers and sync of the communication device. In addition, the communication device may be coupled to software or firmware updates to provide performance information to a remote source (e.g., to providing riding characteristics to a remote server) or performing any other suitable operation that may require the communication device to be coupled to the host device. Several computing devices may be coupled to a single host device using the host device as a server. Alternatively or additionally, the communication device may be coupled to the several host devices (e.g., for each of the plurality of the host devices to serve as a backup for data stored in the communication device).

Moreover, a purpose of the described optimized energy load recommendation system is to solve many of the problems to ease finance and bank energy improvements as a financial or cash based stream, security, investment or other finance mechanism. The efficient potential energy consumption and recommendation system achieves smaller investments for an improved behavior. The improvements identify and implement a high degree of accuracy at a low cost. By doing so, all of related parties, the built environment 102, owners, the operators, the one or more occupants and finance vehicles, the banks, funds and companies involved in selecting, implementing, operating and maintaining the improvements can realize intended gains with a low degree of risk at the low cost. The intended gain can be made in the efficiency of the energy consumptions in existing built environments of all types, sizes, locations and the use.

Further, the optimized energy load recommendation system addresses high costs associated with scaled load. The cost reductions for developing the statistical energy model comes from the segregation of on-site and off-site statistical data collected. Accordingly, different built environments that are metered and billed on a common energy utility account are grouped together to form an aggregation of the loads. In addition, the different built environment facilities are mapped out for future statistical analysis across the different built environments, the locations and the uses.

What is claimed:

1. A method for recommending one or more potential changes in operating parameters associated with a plurality of energy load sources inside a built environment, the method comprising:
fetching a first set of statistical data associated with each of a plurality of energy consuming devices present inside the built environment and a second set of statistical data associated with each of a plurality of users present inside the built environment, wherein the first set of statistical data being fetched based on a first plurality of parameters and wherein the second set of statistical data being fetched based on a second plurality of parameters;
collecting a third set of statistical data associated with one or more ambient parameters of the built environment, wherein the third set of statistical data comprises a past energy consumption data and one or more environmental conditions from one or more sources;
analyzing the first set of statistical data, the second set of statistical data and the third set of statistical data for obtaining an energy consumption pattern of each of the plurality of energy consuming devices present inside the built environment, wherein the analyzing being done by recognizing one or more data points from the first set of statistical data, the second set of statistical data and the third set of statistical data against a plurality of factors; and
recommending the one or more potential changes pertaining to the energy consumption of each of the plurality of energy consuming devices present inside the built environment, wherein the one or more potential changes being recommended to improve the energy consumption behavior associated with each of the plurality of energy consuming devices and wherein the one or more potential changes being recommended based on an analysis of the one or more data points.

2. The method as recited in claim 1, further comprising updating the first set of statistical data, the second set of statistical data, the third set of statistical data and the one or more potential changes.

3. The method as recited in claim 1, wherein the one or more potential changes being recommended for prompting each of a plurality of users to apply the one or more potential changes for reducing the energy consumption of the built environment.

4. The method as recited in claim 1, further comprising storing the first set of statistical data, the second set of statistical data, the third set of statistical data and the one or more potential changes.

5. The method as recited in claim 1, further comprising displaying the first set of statistical data, the second set of statistical data, the third set of statistical data and the one or more potential changes on each of one or more monitoring devices associated with each of the plurality of users associated with the built environment.

6. The method as recited in claim 1, wherein the first set of statistical data, the second set of statistical data and the third set of statistical data being analyzed by applying statistical regression and extrapolation to the energy consumption behavior of each of the plurality of energy consuming devices and wherein the first set of statistical data, the second set of statistical data and the third set of statistical data being analyzed by segregating classes into energy efficient devices and energy inefficient devices from the plurality of energy consuming devices.

7. The method as recited in claim 1, wherein the one or more potential changes being improved by utilizing a learning algorithm to accelerate assessment and analysis of the one or more data points associated with the energy consumption of each of the plurality of energy consuming devices present in the built environment.

8. The method as recited in claim 1, wherein the first plurality of parameters comprises one or more physical characteristics and one or more operational characteristics pertaining to the energy consumption of each of the plurality of energy consuming devices, wherein the one or more operational characteristics comprises a power rating, current usage based on load, voltage, frequency, phase, energy efficiency, thermal efficiency, cost of operations pertaining to each of the plurality of energy consuming devices, a duration of the energy usage for each of the plurality of energy consuming devices, a seasonal variation in the energy consumption and an off-seasonal variation in the energy consumption and wherein the one or more physical characteristics comprises size, physical location, temperature, weight and portability of mechanical and electrical device.

9. The method as recited in claim 1, wherein the second plurality of parameters comprises an occupancy behavior of the plurality of users, an energy consuming pattern associated with a corresponding energy consuming device associated with each of the plurality of users, a physical location of each of the plurality of users, a duration of energy usage of the corresponding energy consuming device associated with each of the plurality of users present in the built environment, a seasonal variation and an off-seasonal variation in a real time occupancy pattern of the plurality of users.

10. The method as recited in claim 1, wherein the plurality of factors comprises base load, variable load, cost of the operations, power consumption, a duration of the energy usage, peak energy demand, average consumption of energy during a specific period, a real time occupancy pattern of each of the plurality of users, the energy demand based on a seasonal variation and an off-seasonal variation and an energy usage based on weather conditions and wherein the one or more sources of the third set of statistical data being a plurality of external application program interfaces and one or more third party databases.

11. The method as recited in claim 1, wherein the one or more potential changes pertaining to the energy consumption of each of the plurality of energy consuming devices comprises replacing a corresponding energy consuming device with a known energy consuming device having a higher percentage of energy efficiency, regulating a duration of energy usage of the plurality of energy consuming devices, regulating a power supply to each of the plurality of energy consuming devices based on an occupancy pattern, utilizing a control system with feedback to control operations, a cost effective device upgrade and displaying a list of malfunctioning devices of the plurality of energy consuming devices.

12. A computer system comprising:
one or more processors; and
a memory coupled to the one or more processors, the memory for storing instructions which, when executed by the one or more processors, cause the one or more processors to perform a method for recommending one or more potential changes in operating parameters associated with a plurality of energy load sources inside a built environment, the method comprising:
fetching a first set of statistical data associated with each of a plurality of energy consuming devices present inside the built environment and a second set of statistical data associated with each of a plurality of users present inside the built environment, wherein the first set of statistical data being fetched based on a first plurality of parameters and wherein the second set of statistical data being fetched based on a second plurality of parameters;
collecting a third set of statistical data associated with one or more ambient parameters of the built environment, wherein the third set of statistical data comprises a past energy consumption data and one or more environmental conditions from one or more sources;
analyzing the first set of statistical data, the second set of statistical data and the third set of statistical data for obtaining an energy consumption pattern of each of the plurality of energy consuming devices present inside the built environment, wherein the analyzing being done by recognizing one or more data points from the first set of statistical data, the second set of statistical data and the third set of statistical data against a plurality of factors; and
recommending the one or more potential changes pertaining to the energy consumption of each of the plurality of energy consuming devices present inside the built environment, wherein the one or more potential changes being recommended to improve the energy consumption behavior associated with each of the plurality of energy consuming devices and wherein the one or more potential changes being recommended based on an analysis of the one or more data points.

13. The computer system as recited in claim 12, further comprising updating the first set of statistical data, the second set of statistical data, the third set of statistical data and the one or more potential changes.

14. The computer system as recited in 12, further comprising storing the first set of statistical data, the second set of statistical data, the third set of statistical data and the one or more potential changes.

15. The computer system as recited in claim 12, further comprising displaying the first set of statistical data, the second set of statistical data, the third set of statistical data and the one or more potential changes on each of one or more monitoring devices associated with each of the plurality of users associated with the built environment.

16. The computer system as recited in claim 12, wherein the first set of statistical data, the second set of statistical data and the third set of statistical data being analyzed by applying statistical regression and extrapolation to the energy consumption behavior of each of the plurality of energy consuming devices and wherein the first set of statistical data, the second set of statistical data and the third set of statistical data being analyzed by segregating classes into energy efficient devices and energy inefficient devices from the plurality of energy consuming devices.

17. A computer-readable storage medium encoding computer executable instructions that, when executed by at least one processor, performs a method for recommending one or more potential changes in operating parameters associated with a plurality of energy load sources inside a built environment, the method comprising:
fetching a first set of statistical data associated with each of a plurality of energy consuming devices present inside the built environment and a second set of statistical data associated with each of a plurality of users present inside the built environment, wherein the first set of statistical data being fetched based on a first plurality of parameters and wherein the second set of statistical data being fetched based on a second plurality of parameters;
collecting a third set of statistical data associated with one or more ambient parameters of the built environment, wherein the third set of statistical data comprises a past energy consumption data and one or more environmental conditions from one or more sources;
analyzing the first set of statistical data, the second set of statistical data and the third set of statistical data for obtaining an energy consumption pattern of each of the plurality of energy consuming devices present inside the built environment, wherein the analyzing being done by recognizing one or more data points from the first set of statistical data, the second set of statistical data and the third set of statistical data against a plurality of factors; and
recommending the one or more potential changes pertaining to the energy consumption of each of the plurality of energy consuming devices present inside the built environment, wherein the one or more potential changes being recommended to improve the energy consumption behavior associated with each of the plurality of energy consuming devices and wherein the one or more potential changes being recommended based on an analysis of the one or more data points.

18. The computer-readable storage medium as recited in claim 17, further comprising instructions for updating the first set of statistical data, the second set of statistical data, the third set of statistical data and the one or more potential changes.

19. The computer-readable storage medium as recited in claim 17, further comprising instructions for storing the first set of statistical data, the second set of statistical data, the third set of statistical data and the one or more potential changes.

20. The computer-readable storage medium as recited in claim 17, further comprising instructions for displaying the first set of statistical data, the second set of statistical data, the third set of statistical data and the one or more potential changes on each of one or more monitoring devices associated with each of the plurality of users associated with the built environment.

* * * * *